(12) United States Patent
Howard

(10) Patent No.: US 6,210,467 B1
(45) Date of Patent: Apr. 3, 2001

(54) CARBON DIOXIDE CLEANING SYSTEM WITH IMPROVED RECOVERY

(75) Inventor: Henry Edward Howard, Grand Island, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/306,816

(22) Filed: May 7, 1999

(51) Int. Cl.⁷ ................................................ B01D 53/14
(52) U.S. Cl. ........................ 95/172; 95/174; 95/177; 95/192; 95/236; 96/234
(58) Field of Search ....................... 95/158, 172, 174, 95/177, 203, 192, 183, 236; 96/234

(56) References Cited

U.S. PATENT DOCUMENTS

| | | | |
|---|---|---|---|
| 3,593,491 | * 7/1971 | Tennyson | 95/177 |
| 3,770,622 | * 11/1973 | Freireich et al. | 95/236 |
| 4,080,424 | 3/1978 | Miller et al. | 423/223 |
| 4,184,855 | 1/1980 | Butwell et al. | 55/48 |
| 4,252,548 | * 2/1981 | Markbreiter et al. | 95/236 |
| 4,305,733 | * 12/1981 | Scholz et al. | 95/236 |
| 4,528,002 | 7/1985 | Linde | 55/48 |
| 4,548,620 | * 10/1985 | Albiol | 95/236 |
| 4,589,896 | * 5/1986 | Chen et al. | 95/236 |

OTHER PUBLICATIONS

Nonhebel, "Gas Purification Processes", 1964, pp. 250–274.
Zawacki et al., "Process Optimized for High Pressure Gas Cleanup", Hydrocarbon Processing, Apr., 1981.

* cited by examiner

Primary Examiner—Duane S. Smith
(74) Attorney, Agent, or Firm—Stanley Ktorides

(57) ABSTRACT

A system for cleaning a carbon dioxide gas stream of water soluble contaminants with improved recovery of carbon dioxide wherein the water soluble contaminants are removed into countercurrently flowing water which undergoes at least one pressure reduction step releasing absorbed carbon dioxide for recapture and recycle into the carbon dioxide gas stream.

10 Claims, 1 Drawing Sheet

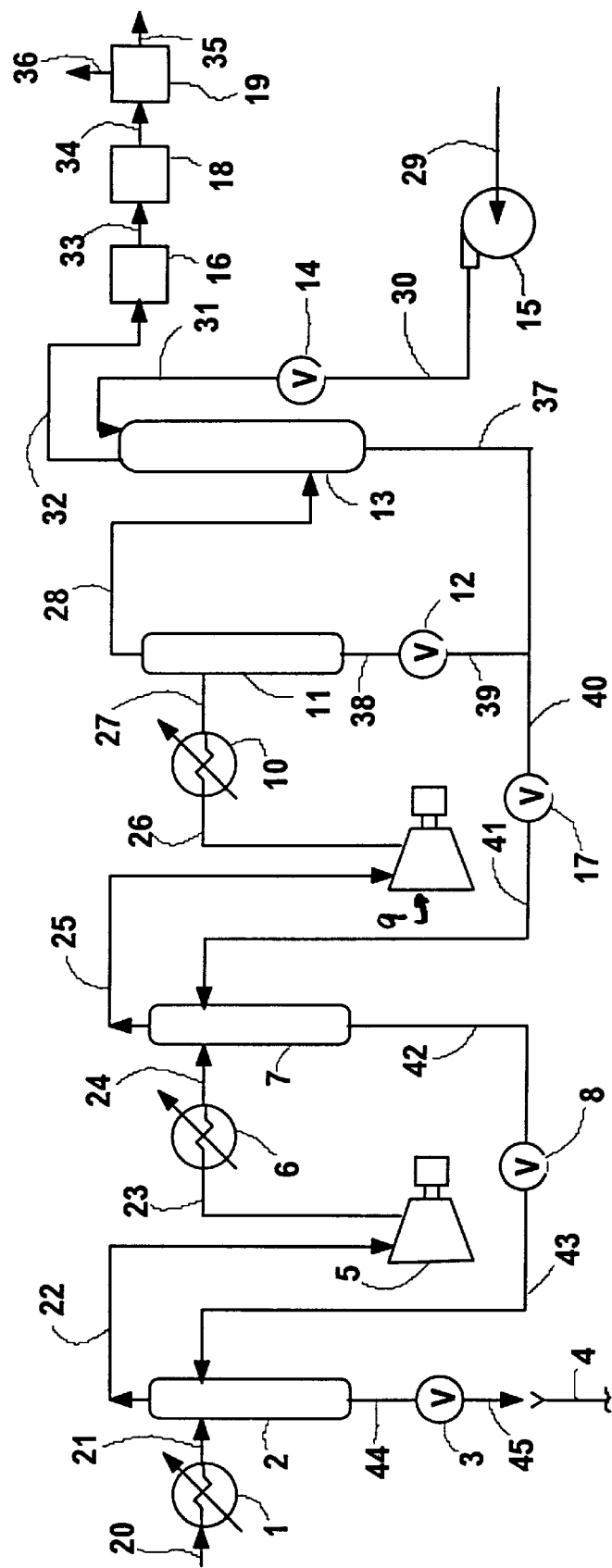

CARBON DIOXIDE CLEANING SYSTEM WITH IMPROVED RECOVERY

TECHNICAL FIELD

This invention relates generally to the production of carbon dioxide.

BACKGROUND ART

Carbon dioxide has a large number of uses. For example, carbon dioxide is used to carbonate beverages, to chill, freeze and package seafood, meat, poultry, baked goods, fruits and vegetables, and to extend the shelf-life of dairy products. It is an important environmental component in industrial waste and process water treatment as a replacement for sulfuric acid to control pH levels. Other uses included drinking water treatment, an environmentally-friendly pesticide and an atmosphere additive in greenhouses to improve the growth of vegetables.

Generally carbon dioxide is produced by purifying a waste stream which is a by-product of an organic or inorganic chemical process. The waste stream comprises carbon dioxide and water soluble contaminants from the chemical process, and the carbon dioxide must be cleaned of these contaminants prior to recovery. The cleaning results in the loss of some of the carbon dioxide.

As the demand for carbon dioxide continues to increase, more effective and efficient carbon dioxide cleaning systems are desirable in order to cost effectively improve the recovery of the carbon dioxide.

Accordingly it is an object of this invention to provide a system which can effectively process a crude carbon dioxide feed stream which contains water soluble contaminants in a more efficient manner than that possible with conventional carbon dioxide processing systems thereby improving the recovery of the carbon dioxide.

SUMMARY OF THE INVENTION

The above and other objects, which will become apparent to one skilled in the art upon a reading of this disclosure, are attained by the present invention, one aspect of which is:

A method for recovering carbon dioxide from a gas stream comprising:

(A) compressing a gas stream comprising carbon dioxide, water vapor and water soluble contaminants to produce a compressed gas stream;

(B) cooling the compressed gas stream to condense at least some of the water vapor, and separating the resulting two-phase fluid into a carbon dioxide-richer gas stream containing water soluble contaminants, and into a remaining liquid;

(C) passing the carbon dioxide-richer gas stream into and up an absorption column, passing water into and down the absorption column, and passing water soluble contaminants and some carbon dioxide from the upflowing carbon dioxide-richer gas stream into the downflowing water within the absorption column to produce cleaned carbon dioxide and contaminant-bearing water containing carbon dioxide gas absorbed therein;

(D) withdrawing and recovering cleaned carbon dioxide from the absorption column; and (E) withdrawing contaminant-bearing water from the absorption column, reducing the pressure of the contaminant-bearing water, releasing absorbed carbon dioxide gas from the contaminant-bearing water, and passing the released carbon dioxide gas into the carbon dioxide-richer gas stream for passage into the absorption column.

Another aspect of this invention is:

Apparatus for cleaning carbon dioxide comprising:

(A) a compressor and means passing a feed stream comprising carbon dioxide, water vapor and water soluble contaminants to the compressor;

(B) an aftercooler, a phase separator, means for passing fluid from the compressor to the aftercooler, and means for passing fluid from the aftercooler to the phase separator;

(C) an absorption column, means for passing fluid from the phase separator into the lower portion of the absorption column, and means for passing water into the upper portion of the absorption column;

(D) means for recovering cleaned carbon dioxide from the upper portion of the absorption column; and (E) a pressure reducing device, means for passing fluid from the lower portion of the absorption column to the pressure reducing device, and means for passing fluid from the pressure reducing device to the phase separator.

As used herein, the term "absorption column" means a vessel wherein a gas and liquid are contacted to transfer one or more components from the gas to the liquid. Typically, the contact will be with upward flow of gas and downward flow of liquid on mass transfer elements such as random or structured packing or trays.

As used herein, the term "phase separator" means a vessel wherein a two phase feed can be separated into its separate gas and liquid fractions. Typically, the phase separator will be a vessel with sufficient cross-sectional area so that the gas and liquid will be disengaged by gravity, with liquid removal at the bottom and vapor removal at the top of the vessel.

As used herein, the term "water soluble contaminants" means any gaseous contaminant that is appreciably soluable in water such as methanol or ethanol.

As used herein, the terms "upper portion" and "lower portion" mean those sections of a column respectively above and below the mid point of the column.

As used herein, the term "indirect heat exchange" means the bringing of two fluids into heat exchange relation without any physical contact or intermixing of the fluids with each other.

As used herein, the term "aftercooler" means an indirect heat exchanger wherein a compressed gas stream comprising water vapor is cooled and at least some of the water vapor is condensed.

As used herein, the term "light contaminants" means one or more species having a vapor pressure greater than that of carbon dioxide. Examples of light contaminants include nitrogen, oxygen, argon, hydrogen, carbon monoxide and methane.

BRIEF DESCRIPTION OF THE DRAWING

The sole FIGURE is schematic representation of one particularly preferred embodiment of the invention wherein the feed stream additionally comprises light contaminants and multiple compression and pressure reduction stages are employed.

DETAILED DESCRIPTION

The invention will be described in detail with reference to the Drawing. Referring now to the FIGURE, gas stream 20 comprises generally from about 90 to 99 mole percent carbon dioxide and up to about 1.0 mole percent water soluble contaminants along with water vapor. In the embodiment of the invention illustrated in the FIGURE, gas stream 20 also comprises light contaminants, typically in a concentration up to about 5 mole percent.

Crude carbon dioxide gas stream 20 is cooled in heat exchanger 1 by indirect heat exchange with a suitable fluid such as forced air, cooling water or a liquid refrigerant, and then passed in stream 21 into phase separator 2 wherein it is separated into a gas portion and a liquid water portion. The gas portion is passed as feed or gas stream 22 to compressor 5 wherein it is compressed to a pressure generally within the range of from about 4 to 6 atmospheres to produce compressed gas stream 23.

Compressed gas stream 23 comprising carbon dioxide, water vapor and water soluble contaminants as well as light contaminants is cooled in aftercooler 6 by indirect heat exchange with a suitable fluid such as forced air, cooling water or a liquid refrigerant. The resulting two-phase fluid is passed in stream 24 into phase separator 7 wherein it is separated into a carbon dioxide-richer gas stream 25, which also contains water soluble contaminants and light contaminants, and also into remaining liquid which is primarily water.

Carbon dioxide-richer gas stream 25 is passed to compressor 9 wherein it is further compressed to a pressure generally within the range of from about 15 to 25 atmospheres to produce further compressed gas stream 26. Further compressed gas stream 26 comprising carbon dioxide and water soluble contaminants as well as light contaminants is cooled in aftercooler 10 by indirect heat exchange with a suitable fluid such as forced air, cooling water or a liquid refrigerant. The resulting two-phase fluid is passed in stream 27 into phase separator 11 wherein it is separated into further carbon dioxide-richer gas stream 28, which also contains water soluble contaminants and light contaminants, and also into further remaining liquid which is primarily water.

Carbon dioxide-richer gas stream 28 is passed into the lower portion of absorption column 13 and flows up the absorption column. Water 29 is pressurized by passage through mechanical pump 15 to a pressure sufficient for introduction into the top of absorption column 13, generally within the range of from 250 to 370 pounds per square inch absolute (psia). Pressurized water 30 is directed through flow/pressure control valve 14 and then as stream 31 is passed into the upper portion of absorption column 13 and down the absorption column.

Absorption column 13 is a vertically oriented vessel generally having random or structured packing as the column internals, i.e. vapor/liquid contact elements, although the column internals may also comprise trays. The column internals serve to facilitate contact between the descending water and the rising gas. As the water descends within absorption column 13 in countercurrent flow to the ascending gas, water soluble contaminants are passed from the rising gas into solution within the descending water so that the descending water is progressively enriched in the water soluble contaminants and the rising gas is progressively depleted of the water soluble contaminants. In addition, some carbon dioxide from the rising gas is absorbed into the downflowing water. This results in the production of cleaned carbon dioxide at the top of column 13 and contaminant-bearing water which also contains some carbon dioxide gas absorbed therein at the bottom of column 13.

The cleaned carbon dioxide is withdrawn from the upper portion of column 13 in stream 32 and, if desired, may be recovered directly. The embodiment of the invention illustrated in the FIGURE is a particularly preferred embodiment wherein the cleaned carbon dioxide undergoes additional processing steps prior to recovery. In the embodiment illustrated in the Figure, gas stream 32 is further cleaned of any remaining water soluble contaminants as well as of water vapor picked up in the countercurrent upflow within column 13 by passage through adsorber 16 which may comprise one or more beds of activated carbon and/or silica. If desired, as illustrated in the Figure, the resulting further cleaned and dried gas 33 may be passed from adsorber 16 to refrigerative means 18 wherein it is cooled and any remaining water is condensed and removed.

As mentioned earlier, in the embodiment of the invention illustrated in the Figure the feed gas also contains light contaminants. In this case the cleaned and dried carbon dioxide gas stream may be passed as stream 34 into a distillation column, illustrated in representational fashion in the Figure as element 19, wherein it is separated by rectification into purified carbon dioxide 35 and light contaminant top vapor 36. The purified carbon dioxide 35 is recovered as a fluid comprising from about 99.9 to 99.999 mole percent carbon dioxide.

The contaminant-bearing water is withdrawn from the lower portion of column 13 in stream 37. Further remaining liquid is withdrawn from phase separator 11 in stream 38, passed through valve 12 and as stream 39 combined with stream 37 to form combined stream 40. Stream 40 is passed through pressure reducing device 17 which in the embodiment illustrated in the Figure is an expansion valve. Pressure reducing device 17 could be other pressure reducing means such as a turboexpander. As contaminant-bearing water stream 40 passes through pressure reducing device 17, its pressure is reduced, generally to be within the range of from 4 to 6 atmospheres, and in the process carbon dioxide gas, which had been absorbed into the contaminant-bearing water, is released resulting in the generation of two phase stream 41 comprising contaminant-bearing water and gaseous carbon dioxide. Two-phase stream 41 is passed into phase separator 7 wherein the released gaseous carbon dioxide in stream 41 is passed into the carbon dioxide-richer stream for eventual passage into absorption column 13 and ultimately for recovery. In this way, some carbon dioxide in the original gas stream 20, which would otherwise have been lost as a consequence of the cleaning process, is recaptured and recovered thus improving the recovery of carbon dioxide in the cleaning system.

The contaminant-bearing water combines with remaining liquid in phase separator 7 and is passed out from phase separator 7 in stream 42 and through pressure reducing device 8, such as an expansion valve or turboexpander, wherein its pressure is reduced generally to be within the range of from 1 to 2 atmospheres. In the process remaining carbon dioxide gas still absorbed within the contaminant-bearing water is released resulting in the generation of two phase stream 43 comprising contaminant-bearing water and gaseous carbon dioxide. Two phase stream 43 is passed into phase separator 2 wherein the released gaseous carbon dioxide in stream 43 is passed into the gas forming gas stream 22 for eventual passage into absorption column 13 and ultimate recovery, thus further improving the carbon dioxide recovery. The residual contaminant-bearing water is combined with the liquid portion of stream 21 in phase separator 2, withdrawn from phase separator 2 in stream 44, passed through valve 3 and as stream 45 passed to capture means, e.g. chemical sewer, 4 for ultimate disposal.

With the practice of this invention recovery of carbon dioxide from any given crude carbon dioxide feed stream can be increased by from 0.5 to 1.0 percent over conventional systems which clean a crude carbon dioxide gas stream of water soluble contaminants.

Although the invention has been described in detail with reference to a certain particularly preferred embodiment, those skilled in the art will recognize that there are other embodiments of the invention within the spirit and the scope of the claims.

What is claimed is:

1. A method for recovering carbon dioxide from a gas stream comprising:
   (A) compressing a gas stream comprising carbon dioxide, water vapor and water soluble contaminants to produce a compressed gas stream;
   (B) cooling the compressed gas stream to condense at least some of the water vapor, and separating the resulting two-phase fluid into a carbon dioxide-richer gas stream containing water soluble contaminants, and into a remaining liquid;
   (C) passing the carbon dioxide-richer gas stream into and up an absorption column, passing water into and down the absorption column, and passing water soluble contaminants and some carbon dioxide from the upflowing carbon dioxide-richer gas stream into the downflowing water within the absorption column to produce cleaned carbon dioxide and contaminant-bearing water containing carbon dioxide gas absorbed therein;
   (D) withdrawing and recovering cleaned carbon dioxide from the absorption column; and
   (E) withdrawing contaminant-bearing water from the absorption column, reducing the pressure of the contaminant-bearing water, releasing absorbed carbon dioxide gas from the contaminant-bearing water, and passing the released carbon dioxide gas into the carbon dioxide-richer gas stream for passage into the absorption column.

2. The method of claim 1 wherein the recovery of cleaned carbon dioxide from the absorption column includes a further step of adsorbing water from the cleaned carbon dioxide prior to recovery.

3. The method of claim 1 wherein the recovery of cleaned carbon dioxide from the absorption column includes a further step of condensing water from the cleaned carbon dioxide prior to recovery.

4. The method of claim 1 wherein the gas stream additionally comprises light contaminants and wherein the recovery of cleaned carbon dioxide from the absorption column includes a further step of separating by distillation light contaminants from the cleaned carbon dioxide prior to recovery.

5. Apparatus for cleaning carbon dioxide comprising:
   (A) a compressor and means passing a feed stream comprising carbon dioxide, water vapor and water soluble contaminants to the compressor;
   (B) an aftercooler, a phase separator, means for passing fluid from the compressor to the aftercooler, and means for passing fluid from the aftercooler to the phase separator;
   (C) an absorption column, means for passing fluid from the phase separator into the lower portion of the absorption column, and means for passing water into the upper portion of the absorption column;
   (D) means for recovering cleaned carbon dioxide from the upper portion of the absorption column; and
   (E) a pressure reducing device, means for passing fluid from the lower portion of the absorption column to the pressure reducing device, and means for passing fluid from the pressure reducing device to the phase separator.

6. The apparatus of claim 5 wherein the pressure reducing device is an expansion valve.

7. The apparatus of claim 5 wherein the means for passing fluid from the phase separator into the lower portion of the absorption column includes a second compressor and a second phase separator.

8. The apparatus of claim 5 wherein the means for recovering cleaned carbon dioxide from the upper portion of the absorption column includes an adsorber.

9. The apparatus of claim 5 wherein the means for recovering cleaned carbon dioxide from the upper portion of the absorption column includes a refrigerative means.

10. The apparatus of claim 5 wherein the means for recovering cleaned carbon dioxide from the upper portion of the absorption column includes a distillation column.

* * * * *